July 4, 1939.　　　L. GEROSA ET AL　　　2,164,739
TRANSPORTING AND DUMPING VEHICLE
Filed May 26, 1938　　　2 Sheets-Sheet 1
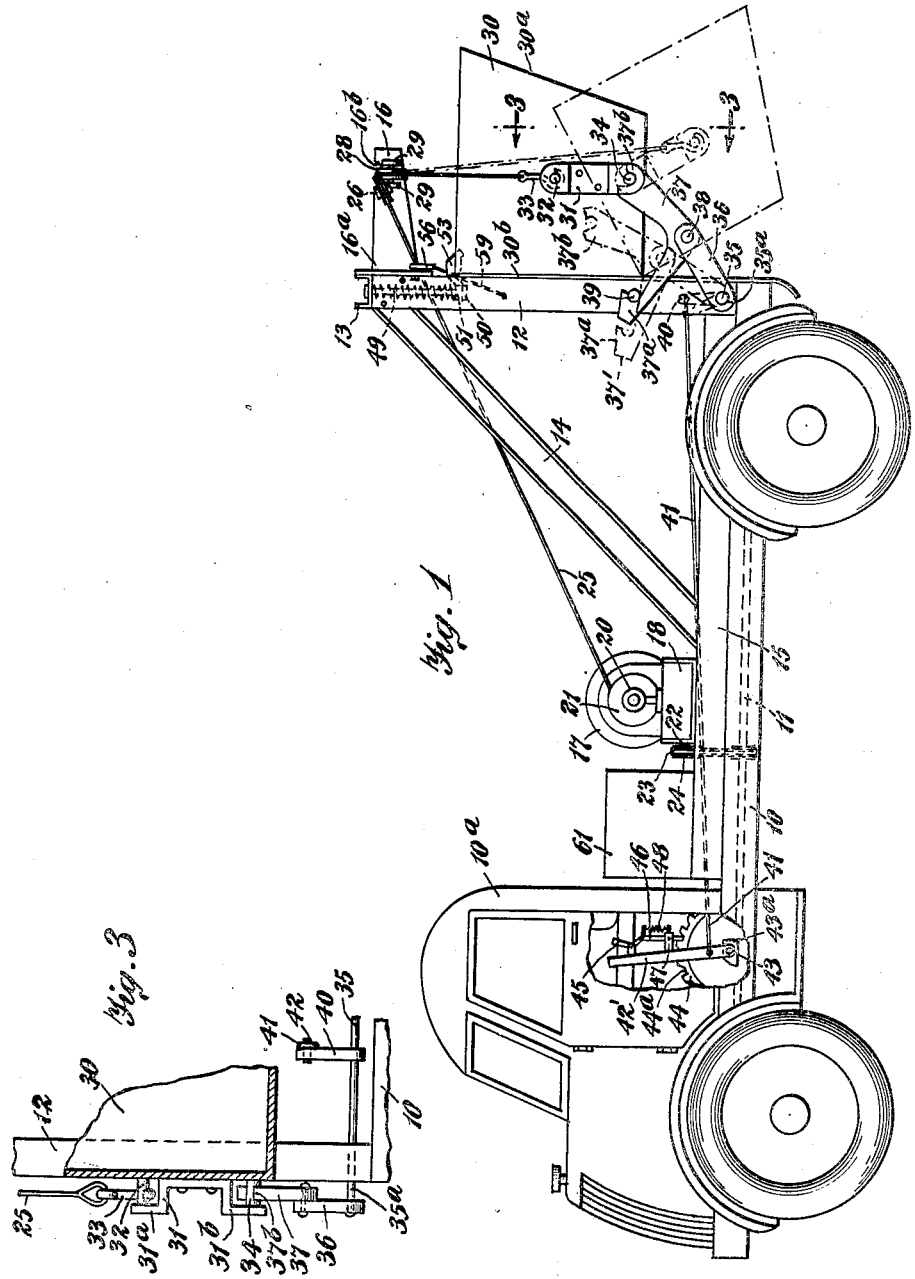
INVENTORS
LAWRENCE GEROSA and
BY　GEORGE P. WAGNER
ATTORNEY.

July 4, 1939.    L. GEROSA ET AL    2,164,739
TRANSPORTING AND DUMPING VEHICLE
Filed May 26, 1938    2 Sheets-Sheet 2
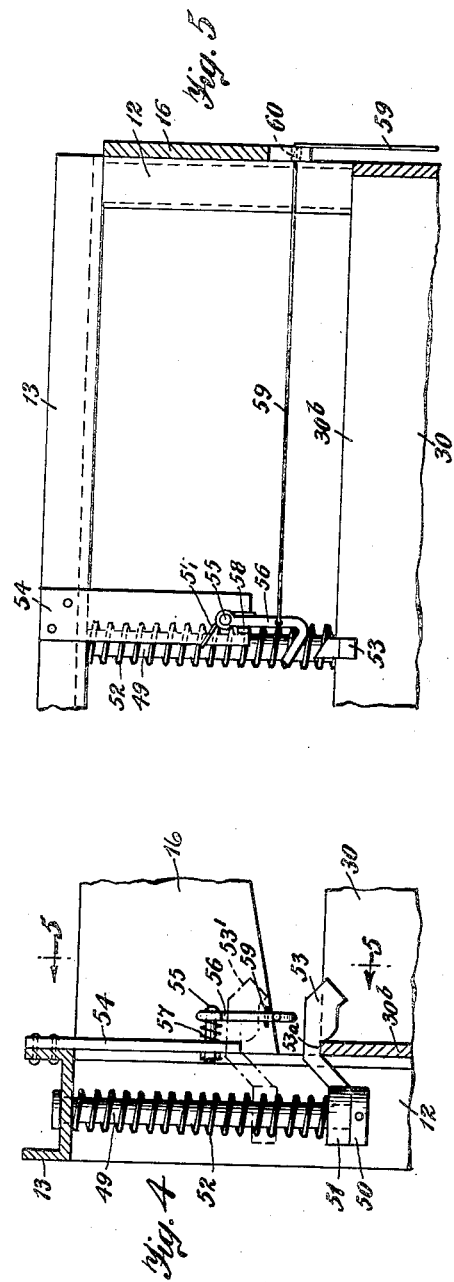
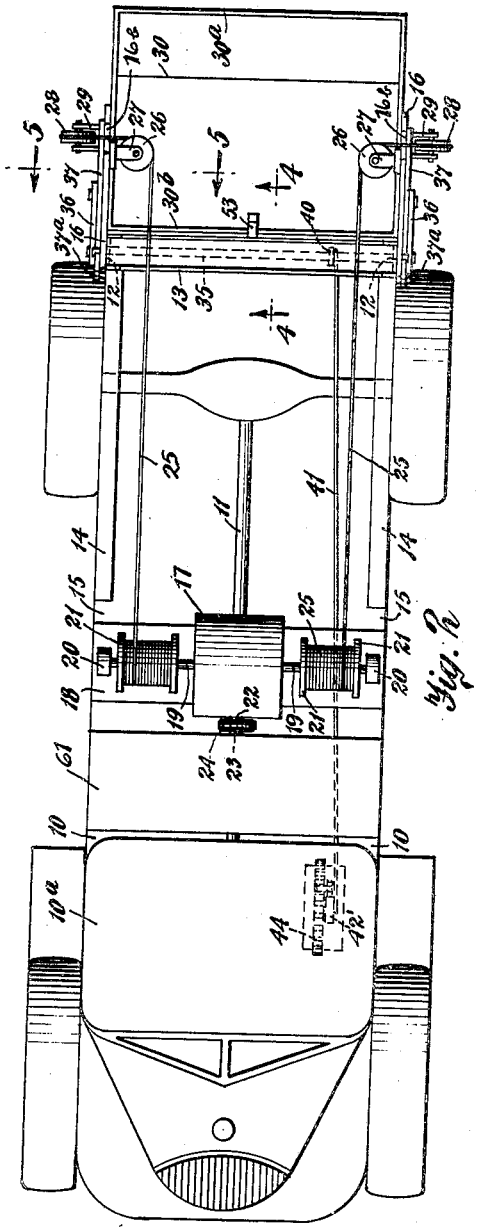
INVENTORS
LAWRENCE GEROSA and
BY  GEORGE P. WAGNER
ATTORNEY.

Patented July 4, 1939

2,164,739

UNITED STATES PATENT OFFICE 2,164,739

TRANSPORTING AND DUMPING VEHICLE

Lawrence Gerosa and George P. Wagner, Bronx, N. Y., assignors to Speed-Dump, Inc., New York, N. Y., a corporation of New York Application May 26, 1938, Serial No. 210,146

9 Claims. (Cl. 214—75)

This invention relates to new and useful improvements in a transporting and dumping vehicle.

The invention has for its main object to characterize the transporting and dumping vehicle by a vertical frame mounted upon the back of the chassis of the vehicle, a hoisting device associated with the frame for lifting and lowering a skip along the frame, and a novel support means associated with the frame and cooperative with the skip for assisting in holding the skip in an elevated position.

More specifically, the invention contemplates the provision of a pair of spaced overhanging top arms projecting from the frame rearwards of the vehicle and supporting cable guiding means for supporting and guiding cables from a hoisting mechanism mounted on the truck to support elements mounted on the skip so that the skip may be elevated along the vertical height of the frame.

An important feature of the invention resides in the specific construction and arrangement of the parts for cooperating with the skip and assisting in supporting the skip in its elevated position.

Still further the invention proposes a novel arrangement whereby the means which assists in supporting the skip further serves as a fulcrum device upon which the skip may be dumped when desired.

Another object of the invention resides in so arranging the supporting means that it may be moved to an inoperative position so that the skip may be lowered and raised without interference, when so required.

Another object of the invention resides in the provision of a mechanism for holding the top portion of the skip in relation to the frame when the skip is in its elevated position to prevent rattling and moving of the skip during transportation of the vehicle.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is an elevational view of a transporting and dumping vehicle constructed according to this invention and having a portion thereof broken away to reveal some interior parts.

Fig. 2 is a top plan view of Fig. 1.

Fig. 3 is a sectional view on the line 3—3 of Fig. 1.

Fig. 4 is an enlarged sectional view on the line 4—4 of Fig. 2.

Fig. 5 is an enlarged sectional view on the line 5—5 of Fig. 2.

The transporting and dumping vehicle, according to this invention, includes a motor driven chassis 10 having a power transmission system 11. The details of the power transmission system are not given in detail in this specification since it forms no part of the invention and is conventional in devices of this type.

A vertical frame is mounted upon the rear portion of the chassis 10 and has top rearwardly projecting arms 16. The frame consists of two vertically extending arms 12 having their bottom ends rested upon and secured to the rear end of the chassis 10. A laterally extending arm 13 extends across the width of the chassis and is securely attached to the top ends of the vertically extended arms 12 for holding them parallel in spaced positions with relation to each other. Support arms 14 have their bottom ends attached to reinforcement members 15 mounted upon the chassis 10. The support arms 14 extend upwardly and rearwardly at an angle with relation to the chassis 10 and have their upper ends connected to the top ends of the vertical arms 12. The support arms 14 act to reinforce the connection between the vertical arms 12 and the chassis 10 and for maintaining the vertical arms in their upright position. The rearwardly projecting arms 16 have their front ends 16a securely attached to the outer faces of the vertical arms 12.

A hoisting winch is mounted on the chassis 10 and has hoisting cables extending rearwards therefrom. This winch consists of a conventional gear box 17 mounted on a platform 18 extending between the sides of the chassis 10. A drive shaft 19 has both of its ends extending from the sides of the gear box and has its outer ends rotatively supported in brackets 20 mounted on the platform 18. Drums 21 are mounted on the shaft 19, one on each side of the gear box 17. A drive shaft 22 extends from the front side of the gear box 17 and is provided with a sprocket 23 over which a sprocket chain 24 extends. The sprocket chain 24 extends downwards over a complementary sprocket wheel attached to a portion of the transmission system 11 for permitting the transmission system of the chassis 10 to be utilized for operating the winch.

A hoisting cable 25 is mounted on each of the drums 21 and extends rearwards therefrom. A cable guide means is provided for each of the cables 25 and each of the cable guide means is mounted upon one of the rearwardly projecting arms 16. These cable guide means include inwardly extended pulleys 26 inclined slightly from the horizontal and supported rotatively in brackets 27 attached to the inner faces of the arms 16. Vertically arranged pulleys 28 are supported upon the outer faces of the arms 16 by means of brackets 29. The cables 25 come from the drums 21 and extend upwards and rearwardly to the rear of the chassis and engage across the pulleys 26. These pulleys 26 are arranged at an angle corresponding with the angle at which the cables 25 extend so that they may easily pass thereover. From the pulleys 26 the cables 25 extend through cutouts 16b formed in the top edges of the support arms 16 and then downwards over the pulleys 28.

A skip 30 is provided for holding earth and other heavy materials. This skip is constructed from steel or other similar material and has an open top into which the earth or other materials may be placed. The front wall 30a of the skip extends upwards at an inclination for permitting the earth to be easily spilled therefrom when the skip is tilted. The rear wall 30b extends vertically upwards and is adapted to extend along the upwardly extended arms 12 of the vertical frame.

A means is provided for detachably connecting the cables 25 to the sides of the skip 30 in the vicinity of its center of gravity for hoisting the skip upwards along the vertical arms 12 of the vertical frame. This means consists of reinforcing plates 31 securely attached to the sides of the skip 30 and which have their upper ends 31a extended from the sides of the skip 30 (see Fig. 3). Pins 32 extend between the adjacent faces of the skip 30 and the ends 31a of the reinforcement plates 31 and are securely attached thereto. The free ends of the cables 25 have hooks 33 which are adapted to be engaged upon the pegs 32 for connecting the ends of the cables 25 with the skip 30. When the hooks are engaged with the pegs 32 the winch may be operated for hoisting the skip 30 upwards with its rear wall 30b extending along the rear faces of the vertical arms 12.

A trunnion 34 extends from each of the sides of the skip 30 at points below its center of gravity. The reinforcement plates 31 also have their bottom ends 31b spaced from the adjacent faces of the end walls of the skip. The trunnion elements extend between the adjacent faces of the skip 30 and the ends 31b and are securely attached thereto.

A support means is movably mounted upon the chassis 10 and is engageable with the trunnions 34 for assisting in supporting the skip 30 and for acting as a fulcrum support to spill the skip 30 when the cables 25 are lowered. Said support means is movable to an inoperative position with relation to the trunnions 34 so that the skip may be raised and lowered along the vertical frame without spilling the same. This means consists of a shaft 35 rotatively mounted between the bottom ends of the vertical arms 12 of the vertical frame. The ends 35a of the shaft 35 extend beyond the outer faces of the arms 12 and have upwardly extended arms 36 securely fixedly attached to the ends thereof. A lever 37 in the form of a bell crank is mounted upon the free ends of each of the arms 36 and is formed at one of its ends with a hook 37a and has the other of its ends bifurcated at 37b. The levers 37 are pivotally supported intermediate of their ends upon the free ends of the arms 36 by means of pins 38. The hooks 37a are adapted to engage outwardly extended pegs 39 attached to the outer faces of the vertically extending arms 12 of the frame for limiting the rearward pivoting of the lever 37 with relation to the levers 36.

The bifurcated ends 37b of the levers 37 are adapted to engage the trunnions 34 from the bottom for supporting the skip upon the rear end of the chassis 10. When the trunnions 34 are engaged into the bifurcated ends 37b the cables 25 may be slackened to such a degree whereby the weight of the skip will be rested upon the levers 37, but which will prevent the skip from pivoting on a point about the trunnions 34. However, when the destination is reached and it is desired to spill the skip it may be accomplished by further slacking the cables 25, permitting the skip 30 to pivot about the trunnion 34 to permit the earth or other materials to be spilled outwards over the upwardly inclined front wall 30a of the skip.

The means for moving the levers 37 to the inoperative positions, shown by the dot and dash lines 37' in Fig. 1 to permit the skip 30 to be moved vertically downwards, consists of an upwardly extending lever 40 attached to the shaft 35 between the upwardly extending arms 12 of the vertical frame. A transmission rod 41 has one of its ends pivotally connected to the upper end of the lever 40 by means of a pin 42, see Fig. 3. The other end of the rod 41 extends to the front of the chassis and into the cabin 10a mounted thereon. The front end of the rod 41 is pivotally connected with a hand lever 42' pivotally attached at its bottom end upon a pin 43 supported on a bracket 43a mounted on the chassis 10.

A means is provided for holding the hand lever 42' in various adjusted pivoted position to correspondingly indirectly hold the shaft 35. This means consists of an arcuately shaped member 44 having its ends attached to the chassis 10 and provided along its top edge with a plurality of teeth 44a.

A bell crank 45 is pivotally supported upon the upper end of the hand lever 42' and has one of its ends connected to a downwardly extended member 46 which passes through a bracket 47 attached to an intermediate portion of the hand lever 42'. The bottom end of the member 46 is adapted to be selectively engaged with the teeth 44a for holding the lever 42' in its selected positions. A spring 48 operates between a portion of the member 46 and the bracket 47 for urging the member 46 into a position in which its lower end will be engaged into one of the teeth 44a. Thus when the bell crank 45 is pivoted towards the hand lever 42' against the holding action of the spring 48, the member 46 will be disengaged from between the teeth 44a and the hand lever 42' will be free to be pivoted about the pin 43. This movement of the hand lever 42' will be transmitted to the shaft 35 by means of the rod 41 and cause the levers 37 to be moved to the inoperative positions. Of course it is necessary to slightly raise the skip 30 to disengage the trunnion 34 from the bifurcated ends 37b of the levers 37 to permit them to move to their inoperative position.

A fastening means is provided for detachably securing the top of the skip to the frame and consists of a peg 49 having its top end securely attached to the horizontal arm 13 and extending downwards therefrom to a position below the top edge of the skip 30 when the skip is rested upon the bifurcated ends 37b of the levers 37 (see Fig. 4). The bottom end of the peg 49 has a collar 50 securely attached thereto. A second collar 51 is slidably supported upon the peg 49. An expansion spring 52 operates between the top face of the slidable collar 51 and the bottom face of the arm 13 for urging the slidable collar against the fixed collar 50. A rearwardly extending catch element 53 is formed on one of the sides of the slidably mounted collar 51 and is provided with a cutout 53a which is adapted to be engaged upon the top edge of the front wall 30b of the skip 30 in its raised position for preventing the skip from pivoting about the trunnion 34 while the vehicle is being transported from place to place.

A means is provided for holding the catch element 53 in a raised position, as illustrated by the dot and dash lines 53' in Fig. 4, for permitting the skip 30 to be spilled when desired. This means consists of a downwardly extending bracket 54 having its top end securely attached to the horizontal arm 13. At its bottom end the bracket 54 is provided with a rearwardly extending bolt 55 which rotatively supports a hook 56. A spring 57 is coaxially mounted on the bolt 55 between the adjacent faces of the bracket 54 and the hook 56 and has its ends operating between the bracket and the hook for urging the same into an operative position. The bracket 54 is formed with a rearwardly extended stop element 58 which is adapted to limit the motion of the hook 56 to an operative position. To engage the catch element 53 into the hook 56 it is merely necessary to slightly raise the skip 30 by means of the hoisting winch to cause the collar 51 to move upwards along the peg 49 against the holding action of the spring 52. As the skip moves upwards the catch element 53 will push the hook 56 to a normal inoperative position against the action of the spring 57. When the catch element 53 passes the outwardly extended end of the hook 56 the spring 57 will urge it back to its normal position, and when the skip is again lowered the catch element 53 will remain in its raised position and the skip 30 will be free to be spilled.

A cable 59 has one of its ends securely attached to the hook 56 and the other of its ends extending through an opening 60 formed in one of the rearwardly projecting arms 16 and extending downwards along the adjacent vertical arm 12 of the vertical frame for permitting the cable to be pulled to pivot the hook 56 to free the catch 53 when so desired to permit the spring 52 to urge it downwards into a position in which the cutout 53a will engage the top edge of the front wall of the skip 30.

A large concrete block 61, or other weight, is extended between the sides of the chassis 10 to the front of the winch and is provided to prevent the chassis from being tilted backwards under the weight of the dirt or other materials placed within the skip 30. It is to be understood that a number of skips 30 may be provided for each chassis 10 to permit the empty skips to be filled while a full skip is being taken away and dumped. This permits the chassis 10 to be in continuous use at all times and permits the workmen to remain at work filling the empty skips, thus doing away with the necessity of waiting for trucks to return after dumping their cargo.

The operation of this device is as follows:

The skip 30 normally rests upon the ground and is adapted to be filled with earth or other material. After the skip 30 has been completely filled the chassis 10 may be backed thereto with the vertical frame extending parallel with the front wall 30b of the skip. The hooks 33 may then be lowered by operating the winch in a direction to leave off the cables 25 from the drums 21. In their lowered position the hooks 33 are adapted to be engaged upon the pegs 32 for connecting the cables with the skip. The skip may then be raised along the vertical frame by operating the winch in a direction to engage the cables 25 upon the drums 21. The skip is raised to a position above the bifurcated ends 37b of the levers 37 and the hand lever 42' is then moved to correspondingly move the levers 37 from the dot and dash positions 37' to their operative positions, illustrated by the full lines in Fig. 1. The skip 30 may then be lowered to cause the trunnions 34 to engage into the bifurcated ends 37b of the levers 37. In this position the levers 37 act to support a portion of the entire weight of the skip 30 and the cables should be just taut enough to prevent the skip from tilting rearwards about the trunnions 34. The catch element 53 should now be engaged over the top edge of the front wall 30b to prevent the skip from shaking on the chassis while it is being transported from place to place.

After a destination has been reached where it is desired to empty the skip, the same may be accomplished by operating the winch to slightly wind the cables 25 to raise the skip 30 to cause the catch element 53 to be engaged with the hook 56 for holding the same in its raised position out of operation. The skip 30 may then be lowered to cause the trunnion 34 to engage into the bifurcated ends 37b of the levers 37. The cables 25 may then be entirely slackened to permit the skip 30 to pivot rearwards about the trunnions 34 to cause the earth or other materials contained therein to be spilled over the rearwardly inclined rear wall 30a of the skip 30. After the skip has been emptied it may be taken back to permit it to be filled again.

While we have illustrated and described our invention with some degree of particularity, we realize that in practice various alterations therein may be made. We therefore reserve the right and privilege of changing the form of the details of construction or otherwise altering the arrangement of the correlated parts without departing from the spirit or the scope of the appended claims.

Having thus described our invention, what we claim as new and desire to secure by United States Letters Patent is:

1. In a transporting and dumping vehicle, a vertical frame having top rearward projecting arms, a hoisting winch mounted on said vehicle and having hoisting cables extending rearwards, cable guide means for said cables and mounted on said projecting arms, a skip for holding earth and other heavy materials, means for detachably connecting said cables to the sides of said skip in the vicinity of its center of gravity for hoisting the skip upwards along said vertical frame, a trunnion projecting from each side of said skip at points below said center of gravity, and support means movably mounted on said chassis and engageable with said trunnion for assisting in supporting the skip and for acting as a fulcrum support to spill or dump the skip when said cables are lowered and movable to an inoperative position so that the skip may be lowered without spilling same said support means, comprising bell-crank levers pivotally supported intermediate of their ends on said vertical frame and one of their arms being detachably connected with said frame and the other of their arms being bifurcated to engage and support said trunnion.

2. In a transporting and dumping vehicle, a vertical frame having top rearward projecting arms, a hoisting winch mounted on said vehicle and having hoisting cables extending rearwards, cable guide means for said cables and mounted on said projecting arms, a skip for holding earth and other heavy materials, means for detachably connecting said cables to the sides of said skip in the vicinity of its center of gravity for hoisting the skip upwards along said vertical frame, a trunnion projecting from each side of said skip at points below said center of gravity, and support means movably mounted on said chassis and engageable with said trunnion for assisting in supporting the skip and for acting as a fulcrum support to spill or dump the skip when said cables are lowered and movable to an inoperative position so that the skip may be lowered without spilling same, said support means, comprising bell-crank levers pivotally supported intermediate of their ends on said vertical frame and having one of their arms detachably connected with said frame and the other of their arms bifurcated to engage and support said trunnion, and means for pivoting said levers to an inoperative position to permit said skip to be raised and lowered without obstruction.

3. In a transporting and dumping vehicle, a vertical frame having top rearward projecting arms, a hoisting winch mounted on said vehicle and having hoisting cables extending rearwards, cable guide means for said cables and mounted on said projecting arms, a skip for holding earth and other heavy materials, means for detachably connecting said cables to the sides of said skip in the vicinity of its center of gravity for hoisting the skip upwards along said vertical frame, a trunnion projecting from each side of said skip at points below said center of gravity, and support means movably mounted on said chassis and engageable with said trunnion for assisting in supporting the skip and for acting as a fulcrum support to spill or dump the skip when said cables are lowered and movable to an inoperative position so that the skip may be lowered without spilling same, said means for detachably connecting said cables with said skip comprising hooks attached to the free ends of said cables, reinforcement plates extending vertically along the sides of said skip and having their top ends spaced from the sides of said skip, pegs extending between the adjacent faces of the top ends of said reinforcement plates and said skip and upon which said hooks are engageable for connecting said cables to said skip.

4. In a transporting and dumping vehicle, a vertical frame having top rearward projecting arms, a hoisting winch mounted on said vehicle and having hoisting cables extending rearwards, cable guide means for said cables and mounted on said projecting arms, a skip for holding earth and other heavy materials, means for detachably connecting said cables to the sides of said skip in the vicinity of its center of gravity for hoisting the skip upwards along said vertical frame, a trunnion projecting from each side of said skip at points below said center of gravity, and support means movably mounted on said chassis and engageable with said trunnion for assisting in supporting the skip and for acting as a fulcrum support to spill or dump the skip when said cables are lowered and movable to an inoperative position so that the skip may be lowered without spilling same, said means for detachably connecting said cables with said skip comprising hooks attached to the free ends of said cables, reinforcement plates extending vertically along the sides of said skip and having their top ends spaced from the sides of said skip, pegs extending between the adjacent faces of the top end of said reinforcement plates and said skip and upon which said hooks are engageable for connecting said cables to said skip, and said reinforcing plates also having their bottom ends spaced from the adjacent faces of said skip, said trunnion elements extending between the adjacent faces of said skip and the bottom ends of said reinforcement plates.

5. In a transporting and dumping vehicle, a vertical frame having top rearward projecting arms, a hoisting winch mounted on said vehicle and having hoisting cables extending rearwards, cable guide means for said cables and mounted on said projecting arms, a skip for holding earth and other heavy materials, means for detachably connecting said cables to the sides of said skip in the vicinity of its center of gravity for hoisting the skip upwards along said vertical frame, a trunnion projecting from each side of said skip at points below said center of gravity, and support means movably mounted on said chassis and engageable with said trunnion for assisting in supporting the skip and for acting as a fulcrum support to spill or dump the skip when said cables are lowered and movable to an inoperative position so that the skip may be lowered without spilling same, comprising a pair of arms, a means for holding said arms in different positions, a lever mounted on each arm and having a hook at one end and a bifurcated portion at the other end, and in one position of said arms said hooks engaging stationary elements and the bifurcated portions engaging said trunnions for supporting said skip.

6. In a transporting and dumping vehicle, a vertical frame having top rearward projecting arms, a hoisting winch mounted on said vehicle and having hoisting cables extending rearwards, cable guide means for said cables and mounted on said projecting arms, a skip for holding earth and other heavy materials, means for detachably connecting said cables to the sides of said skip in the vicinity of its center of gravity for hoisting the skip upwards along said vertical frame, a trunnion projecting from each side of said skip at points below said center of gravity, and support means movably mounted on said chassis and engageable with said trunnion for assisting in supporting the skip and for acting as a fulcrum support to spill or dump the skip when said cables are lowered and movable to an inoperative position so that the skip may be lowered without spilling same, comprising a pair of arms, a means for holding said arms in different positions, a lever mounted on each arm and having a hook at one end and a bifurcated portion at the other end, and in one position of said arms said hooks engaging stationary elements and the bifurcated portions engaging said trunnion for supporting said skip, said arms being fixedly attached to the outer ends of a shaft rotatively supported between portions of said vertical frame.

7. In a transporting and dumping vehicle, a vertical frame having top rearward projecting arms, a hoisting winch mounted on said vehicle and having hoisting cables extending rearwards, cable guide means for said cables and mounted on said projecting arms, a skip for holding earth and other heavy materials, means for detachably connecting said cables to the sides of said skip in the vicinity of its center of gravity for hoisting the skip upwards along said vertical frame, a trunnion projecting from each side of said skip at points below said center of gravity, and support means movably mounted on said chassis and engageable with said trunnion for assisting in supporting the skip and for acting as a fulcrum support to spill or dump the skip when said cables are lowered and movable to an inoperative position so that the skip may be lowered without spilling same, comprising a pair of arms, a means for holding said arms in different positions, a lever mounted on each arm and having a hook at one end and a bifurcated portion at the other end, and in one position of said arms said hooks engaging stationary elements and the bifurcated portions engaging said trunnion for supporting said skip, said arms being fixedly attached to the outer ends of a shaft rotatively supported between portions of said vertical frame, said means for holding the arms in different rotative positions comprising an upwardly extended lever extending from said shaft, a rod pivotally attached to the upper end of said lever and having its free end pivotally connected with a hand lever, said hand lever being pivotally supported and movable to correspondingly move said arms to change the position of the bifurcated portions of said levers with relation to said trunnion, and a means for holding said hand lever in various adjusted positions to correspondingly hold said levers.

8. In a transporting and dumping vehicle, a vertical frame having top rearward projecting arms, a hoisting winch mounted on said vehicle and having hoisting cables extending rearwards, cable guide means for said cables and mounted on said projecting arms, a skip for holding earth and other heavy materials, means for detachably connecting said cables to the sides of said skip in the vicinity of its center of gravity for hoisting the skip upwards along said vertical frame, a trunnion projecting from each side of said skip at points below said center of gravity, and support means movably mounted on said chassis and engageable with said trunnion for assisting in supporting the skip and for acting as a fulcrum support to spill or dump the skip when said cables are lowered and movable to an inoperative position so that the skip may be lowered without spilling same, and fastening means for detachably securing the top of said skip to said frame comprising a catch element for engaging the top of said skip and being movable to an inoperative position with relation to said skip, means for holding said catch element inoperative, and means for rendering said latter means inoperative.

9. In a transporting and dumping vehicle, a vertical frame having top rearward projecting arms, a hoisting winch mounted on said vehicle and having hoisting cables extending rearwards, cable guide means for said cables and mounted on said projecting arms, a skip for holding earth and other heavy materials, means for detachably connecting said cables to the sides of said skip in the vicinity of its center of gravity for hoisting the skip upwards along said vertical frame, a trunnion projecting from each side of said skip at points below said center of gravity, and support means movably mounted on said chassis and engageable with said trunnion for assisting in supporting the skip and for acting as a fulcrum support to spill or dump the skip when said cables are lowered and movable to an inoperative position so that the skip may be lowered without spilling same, and fastening means for detachably securing the top of said skip to said frame, said fastening means comprising a catch element for engaging the top of said skip and being movable to an inoperative position with relation to said skip and a hook for holding said catch element in an inoperative position with relation to said skip, and a means for moving said hook to an inoperative position to release said catch element when so desired.

LAWRENCE GEROSA.
GEORGE P. WAGNER.